(12) United States Patent
Sanders et al.

(10) Patent No.: US 9,707,938 B2
(45) Date of Patent: Jul. 18, 2017

(54) TIRE GROOVE CLEANING MECHANISM

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventors: Evan Sanders, Honea Path, SC (US); Derick Lonell Harris, Greenville, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 14/770,213

(22) PCT Filed: Mar. 14, 2013

(86) PCT No.: PCT/US2013/031149
§ 371 (c)(1),
(2) Date: Aug. 25, 2015

(87) PCT Pub. No.: WO2014/142859
PCT Pub. Date: Sep. 18, 2014

(65) Prior Publication Data
US 2016/0214578 A1    Jul. 28, 2016

(51) Int. Cl.
*B60S 1/68*   (2006.01)
(52) U.S. Cl.
CPC ..................... *B60S 1/68* (2013.01)

(58) Field of Classification Search
CPC ................................... B60S 1/68; B60S 1/685
USPC ............... 15/256.5, 256.51, 256.52, 256.53; 280/855, 158.1, 856
See application file for complete search history.

(56) References Cited

U.S. PATENT DOCUMENTS

| | | | | |
|---|---|---|---|---|
| 520,278 | A | * | 5/1894 | Wehrenberg ........... A01B 63/22 172/400 |
| 1,167,400 | A | * | 1/1916 | Gobiet ...................... B60S 1/68 172/547 |
| 1,292,375 | A | * | 1/1919 | Richmond .............. B60B 15/02 280/855 |

(Continued)

FOREIGN PATENT DOCUMENTS

| DE | 19926593 | 1/2001 |
|---|---|---|
| EP | 2099180 | 12/2008 |

OTHER PUBLICATIONS

PCT/US2013/031149 International Search Report dated May 31, 2013.

*Primary Examiner* — Hau Phan
*Assistant Examiner* — Jacob Meyer
(74) *Attorney, Agent, or Firm* — Dority & Manning, P.A.

(57) ABSTRACT

A tire cleaning device is provided that helps remove obstructions from the longitudinal grooves of a tire tread. The device can be configured to operate with different types of obstructions and with tires having longitudinal grooves incorporated within differing tread patterns. In certain exemplary embodiments, the device can be equipped to operate with a tire on vehicle that has a suspension system which allows the tire to move along the vertical direction during vehicle operation.

20 Claims, 8 Drawing Sheets

(56) References Cited

U.S. PATENT DOCUMENTS

| | | | | |
|---|---|---|---|---|
| 1,430,968 A * | 10/1922 | Ferry | | B60S 1/68 |
| | | | | 301/43 |
| 2,484,948 A * | 10/1949 | Lafrate | | B29C 73/245 |
| | | | | 15/236.08 |
| 3,085,484 A | 4/1963 | McAdams | | |
| 3,318,432 A * | 5/1967 | Mullis | | B62B 5/0428 |
| | | | | 186/62 |
| 3,450,013 A | 6/1969 | Peterson | | |
| 3,922,106 A | 11/1975 | Caron | | |
| 3,988,071 A | 10/1976 | Cochran | | |
| 4,246,946 A * | 1/1981 | Stinaff | | B60C 13/023 |
| | | | | 152/151 |
| 4,605,239 A | 8/1986 | Warfel | | |
| 5,188,394 A * | 2/1993 | Roche | | B60S 1/68 |
| | | | | 172/606 |
| 5,226,703 A * | 7/1993 | Norman | | B62D 55/0882 |
| | | | | 305/107 |
| 5,343,588 A * | 9/1994 | Chen | | A46B 7/04 |
| | | | | 15/256.5 |
| 5,360,288 A | 11/1994 | O'Neill | | |
| 5,426,816 A * | 6/1995 | Chen | | A46B 7/04 |
| | | | | 15/256.5 |
| 5,430,906 A * | 7/1995 | Drury | | B62D 25/182 |
| | | | | 15/160 |
| 5,566,420 A * | 10/1996 | Specht | | A46B 7/023 |
| | | | | 15/256.5 |
| 5,857,238 A * | 1/1999 | Jmill | | B60S 1/68 |
| | | | | 15/244.1 |
| 6,334,630 B1 * | 1/2002 | Barros, Sr. | | A01B 71/08 |
| | | | | 15/256.5 |
| 6,578,934 B2 * | 6/2003 | Ito | | E01H 5/04 |
| | | | | 280/855 |
| 7,066,682 B2 | 6/2006 | Hester | | |
| 7,614,463 B1 * | 11/2009 | Hunziker | | E21B 12/06 |
| | | | | 15/256.53 |
| 8,203,097 B2 * | 6/2012 | Klaiber | | B08B 1/00 |
| | | | | 15/256.5 |
| 9,067,570 B2 * | 6/2015 | Kueppers | | B60S 1/68 |
| 9,346,438 B1 * | 5/2016 | Parker, III | | B60S 1/68 |
| 2011/0277785 A1 * | 11/2011 | Gehm | | B66B 31/003 |
| | | | | 134/6 |

\* cited by examiner

TIRE GROOVE CLEANING MECHANISM

FIELD OF THE INVENTION

The subject matter of the present disclosure relates generally to a device for cleaning the grooves of a tire.

BACKGROUND OF THE INVENTION

Many tire tread patterns include one or more longitudinal grooves—i.e. grooves that extend circumferentially around the tire. Such grooves can improve the traction performance of the tire when driving and turning in conditions such as snow and mud. Optimal performance of the longitudinal grooves generally requires that the grooves be clear of obstructions.

Unfortunately, during tire use, the grooves can become blocked or clogged. For example, mud can load the longitudinal grooves, rocks can become lodged in the grooves, and/or other foreign materials can enter and degrade traction performance. For example, hydroplaning resistance and mud or snow traction may decrease. These problems can occur irrespective of the depth or shape of the longitudinal groove.

Centrifugal forces created as the tire rotates may not be sufficient to dislodge all obstructions of the longitudinal grooves. For a stone or pebble, for example, such obstruction may be wedged into place. With mud or snow, these materials may become compacted and/or the tire rotation speed may not be high enough to provide ejection. Additionally, the presence of a stone in a longitudinal groove can lead to a tire puncture resulting in an air leak and/or the undesirable presence of moisture within the structure of the tire.

Challenges exist with designing and applying devices to remove the obstructions. For example, one proposed solution would utilize a bristle brush positioned into contact with the tread for the removal of material from the grooves. As the tire rotates, the brushes are intended to clean the grooves. However, constant contact between the brush and tire during rotation wears the brush necessitating its replacement and can cause premature wear on the tire. Also, a multi-component assembly is used to position the brush into contact with the tire.

Another challenge relates to the non-rotational movement of the tire during use. More specifically, many vehicles are equipped with suspension systems that e.g., allow the tire to move relative to the vehicle along the vertical direction as the tire rolls over an obstacle. This movement can increase the comfort of the vehicle operator during such an event by having the vehicle's suspension system absorb some of the vertical movement rather than translating such movement directly to the body of the vehicle. However, the changing position of the tire increases the difficulty of locating a device to remove material from the tread.

Accordingly, a device for removing obstructions from the longitudinal grooves of a tire tread would be useful. Such a device that can be equipped to remove a variety of different types of obstructions would be particularly beneficial. Such a device that can be equipped to operate with a tire mounted on a suspension system which allows movement of the tire relative to the vehicle would also be useful.

SUMMARY OF THE INVENTION

The present invention provides a device that helps remove obstructions from the longitudinal grooves of a tire tread. The device can be configured to operate with different types of obstructions and with tires having longitudinal grooves incorporated within differing tread patterns. In certain exemplary embodiments, the device can be equipped to operate with a tire on vehicle that has a suspension system which allows the tire to move along the vertical direction during vehicle operation. Additional objects and advantages of the invention will be set forth in part in the following description, or may be apparent from the description, or may be learned through practice of the invention.

In one exemplary embodiment of the present invention, a device for cleaning a tire having a longitudinal groove is provided. The longitudinal groove has a curvature along a circumferential direction of the tire. A cleaning element is carried upon the vehicle and is positioned within the groove of the tire. The groove has a groove bottom. The cleaning element is suspended over the groove bottom so as to create a gap between the cleaning element and the groove bottom. The cleaning element has a longitudinal axis that tracks the curvature of the groove along the circumferential direction.

In another exemplary embodiment, the present invention provides a tire cleaning device. This device includes a wheel spat carried upon a non-sprung portion of a vehicle and positioned adjacent to a tire of the vehicle. The tire has at least one longitudinal groove with a groove bottom. The wheel spat provides a channel. A cleaning element is removably received into the channel of the wheel spat. The cleaning element is configured as an elongated strip positioned in the longitudinal groove of the tire and suspended above the groove bottom over a portion of the longitudinal groove.

In still another exemplary embodiment, the present invention provides a cleaning element for a tire having at least one longitudinal groove. The longitudinal groove has a curvature along a circumferential direction of the tire. The cleaning element includes an elongated strip having a body portion comprising a resilient material. The elongated strip has a longitudinal axis that tracks the curvature of the longitudinal groove along the circumferential direction of the tire. The elongated strip is configured to be suspended within the longitudinal groove of the tire so as to create a gap between the elongated strip and the groove.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION

Figure 1:
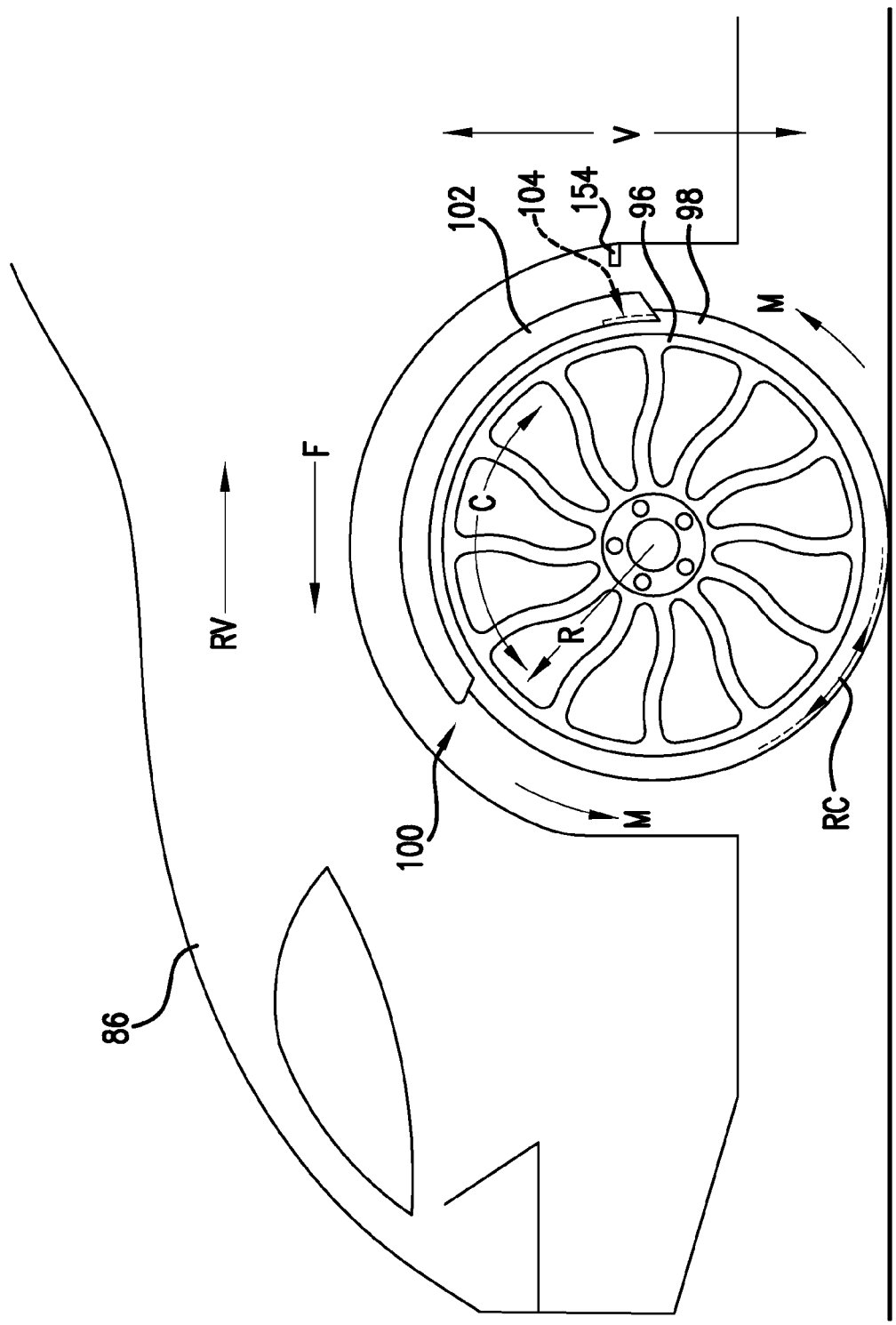
FIG. 1 illustrates a side view of an exemplary embodiment of tire cleaning device of the present invention positioned next to a wheel and tire.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 2:
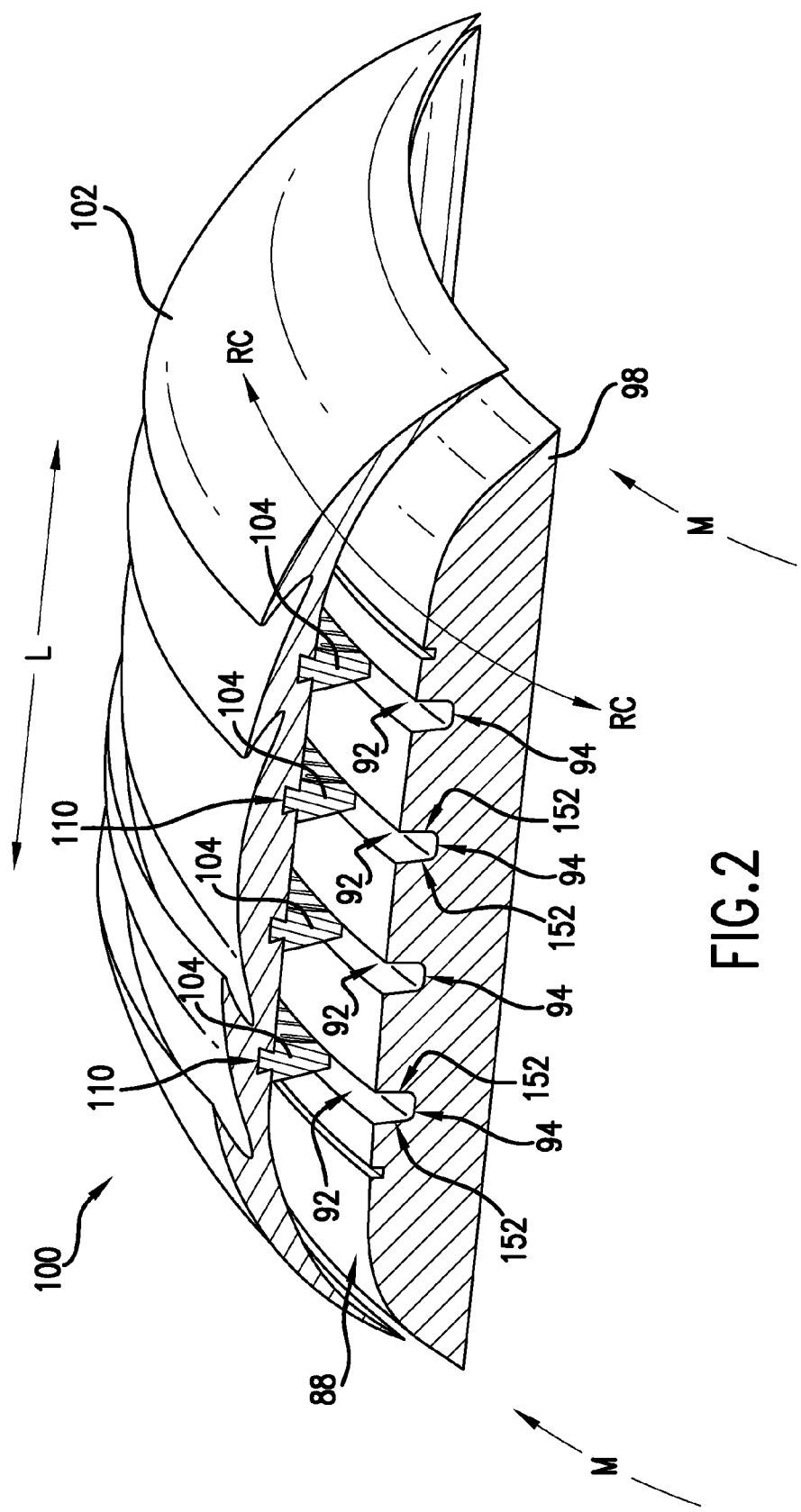
FIG. 2 is a cross-sectional and perspective view of the exemplary embodiment of FIG. 1 showing the placement of exemplary cleaning elements along longitudinal grooves of the tire.

FIGS. 1 and 2 illustrate an exemplary embodiment of a tire cleaning device 100 of the present invention. FIG. 1 provides a side view of the device 100 as it would be carried by a vehicle and adjacent to a tire 98 mounted on a wheel 96. FIG. 2 is a cross-sectional view of the exemplary embodiment of FIG. 1 showing the placement of exemplary cleaning elements 104 along longitudinal grooves 92 of tire 98. Longitudinal grooves 92 are part of a tread pattern formed in the tread region 88 of tire 98. As used herein, "longitudinal groove" means a groove having a curvature in a direction along circumferential direction C of tire 98 as illustrated by arrows RC in FIG. 2.

The particular pattern and shape for longitudinal grooves 92 shown in the figures is provided by way of example only. The present invention may be used with other tread patterns on both pneumatic and non-pneumatic tires and various other wheel constructions. For example, while at least four longitudinal grooves are shown in FIG. 2, the present invention may be used with more or less as well. Additionally, one or all of the longitudinal grooves 92 can be equipped with various features. For example, longitudinal groove 92 could be configured with projections such as stone ejectors on groove bottom 94. Other constructions may be used as well.

Tire cleaning device 100 includes a wheel spat 102 that is positioned proximate to tire 98. More particularly, for this exemplary embodiment, spat 102 is carried upon a non-sprung portion of vehicle 86 or strut type suspension and is positioned adjacent to tire 98. As used herein, the non-sprung portion refers to the portion of vehicle 86 that moves with tire 98 and wheel 96 as such move along vertical direction V when e.g., passing over an obstacle. For example, the non-sprung portion could include a control arm or A frame and other portions may be used as well. The non-sprung portion can be contrasted with e.g., the vehicle's frame, which is typically supported by a suspension system that includes e.g., springs, shock absorbers, and/or other elements such that the frame does not track with the movement of the tire along vertical direction V as the vehicle is operated. Device 100 can be anchored to any appropriate fixed portion of the vehicle for non-steer tires.

Figure 3:
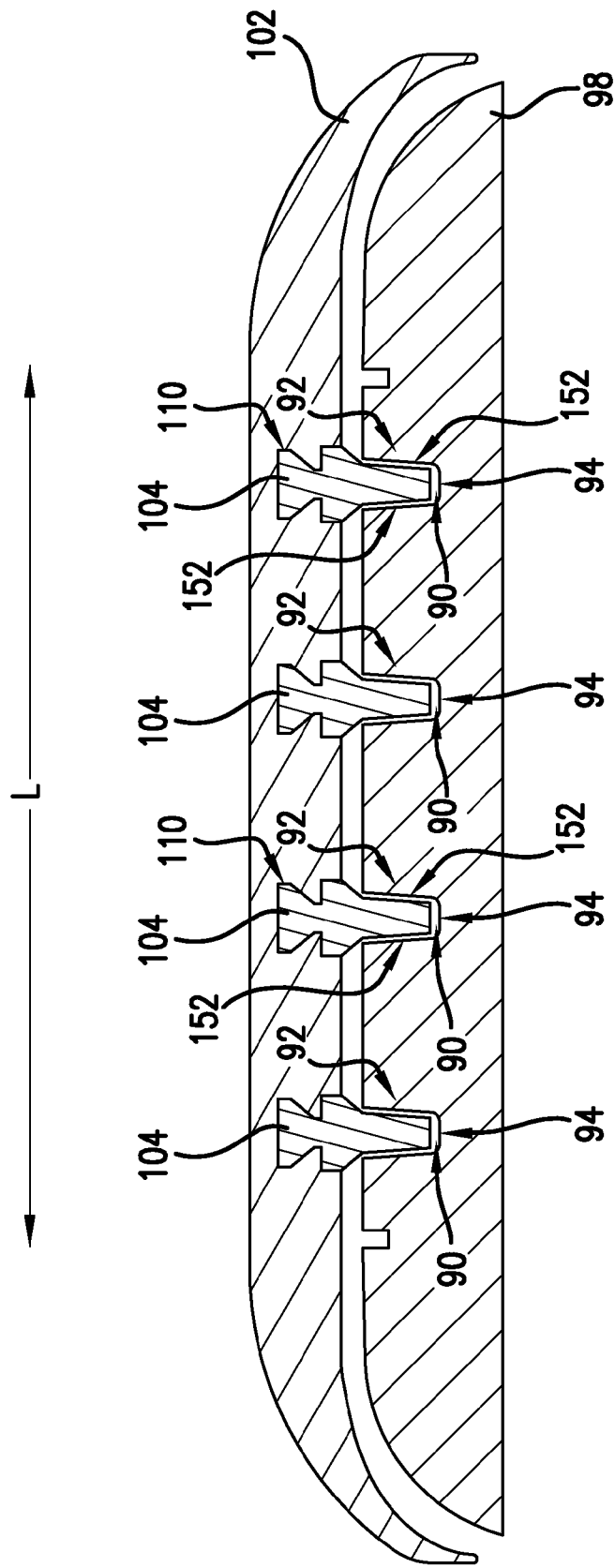
FIG. 3 provides a cross-sectional view of the exemplary embodiment of FIG. 1 and also shows the placement of exemplary cleaning elements along longitudinal grooves of the tire.

Tire cleaning device 100 includes a plurality of cleaning elements 104 that are carried upon wheel spat 102 and positioned within longitudinal grooves 92 of tire 98. As best seen in FIG. 3, each cleaning element 104 is suspended over a groove bottom 94 (which could be flat as shown, V-shaped, U-shaped, or other configurations as well) so as to create a gap 90 between the cleaning element 104, groove bottom 94, and/or the sides 152 of groove 92. More particularly, for this exemplary embodiment, cleaning elements 104 are suspended over tire 100 so that they do not ride upon tire 98 during operation of vehicle 100. Where projections such as stone ejectors or other features are used in grooves 92, cleaning elements 104 can be configured to have a gap between the top surfaces of such projections. While incidental contact may occur, gap 90 provides a separation that helps the increase the useful life of cleaning element 104 by protecting it from abrasive wear that would otherwise occur if it remained in contact with tire 100 during operation of vehicle 96. Maintaining the separation provided by gap 90 can also help prevent tire wear.

Accordingly, as vehicle 96 moves in a forward direction as indicated by arrow F in FIG. 1, tire 98 rotates in the direction shown by arrows M and, therefore, moves relative to wheel spat 102. As tire 98 rotates, obstructions such as e.g., rocks, mud, snow, etc., that are present in one or more of the longitudinal grooves 92 will eventually come into contact with one or more cleaning elements 104 resulting in ejection from grooves 92. For example, the impact of the obstructions with cleaning elements 104 as tire 98 rotates will dislodge all or at least part of the obstructions so as to clean longitudinal grooves 92. As a result, traction performance of tire 98 is improved as compared to tire 98 if grooves 92 are partially or completely filled with obstructions.

Figure 4:
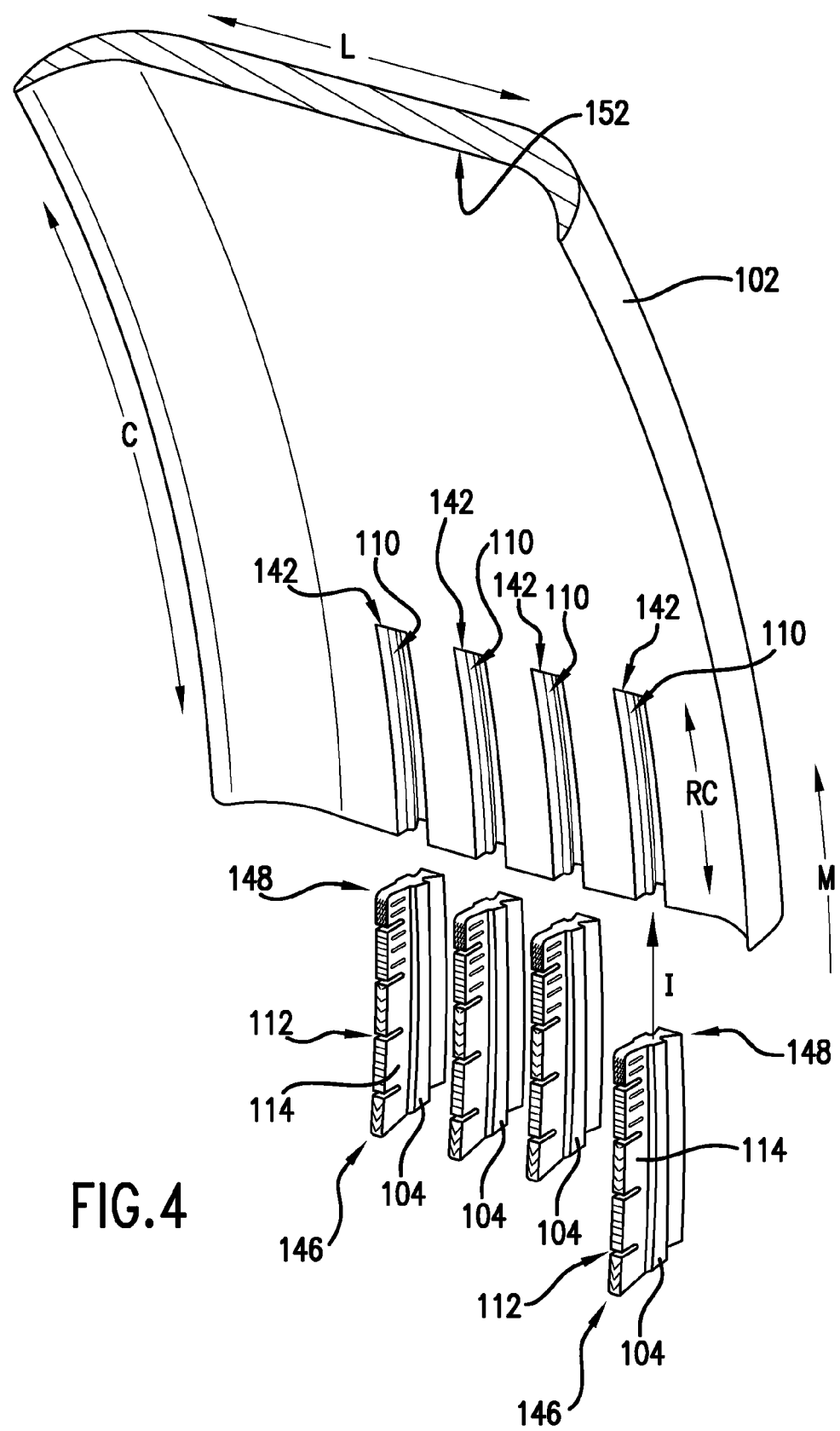
FIG. 4 is a perspective view of the underside of an exemplary wheel spat of the present invention showing insertion of exemplary cleaning elements.

As shown in FIGS. 2, 3, and 4, cleaning elements 104 are received into channels 110 formed in wheel spat 102. Channels 110 are spaced apart from each other along lateral direction L and extend longitudinally along circumferential direction C of tire 98. For this exemplary embodiment, channels 110 are formed directly in wheel spat 102. Other constructions for channels 110 may be used as well. Cleaning elements 104 are installed by sliding along the direction of arrow I (FIG. 4) into channels 110 until an end 148 of cleaning element 104 contacts stop 142. As some wear may eventually occur from use, cleaning elements 104 can also be replaced in this exemplary embodiment by sliding in an opposite direction out of wheel spat 102.

Figure 5:
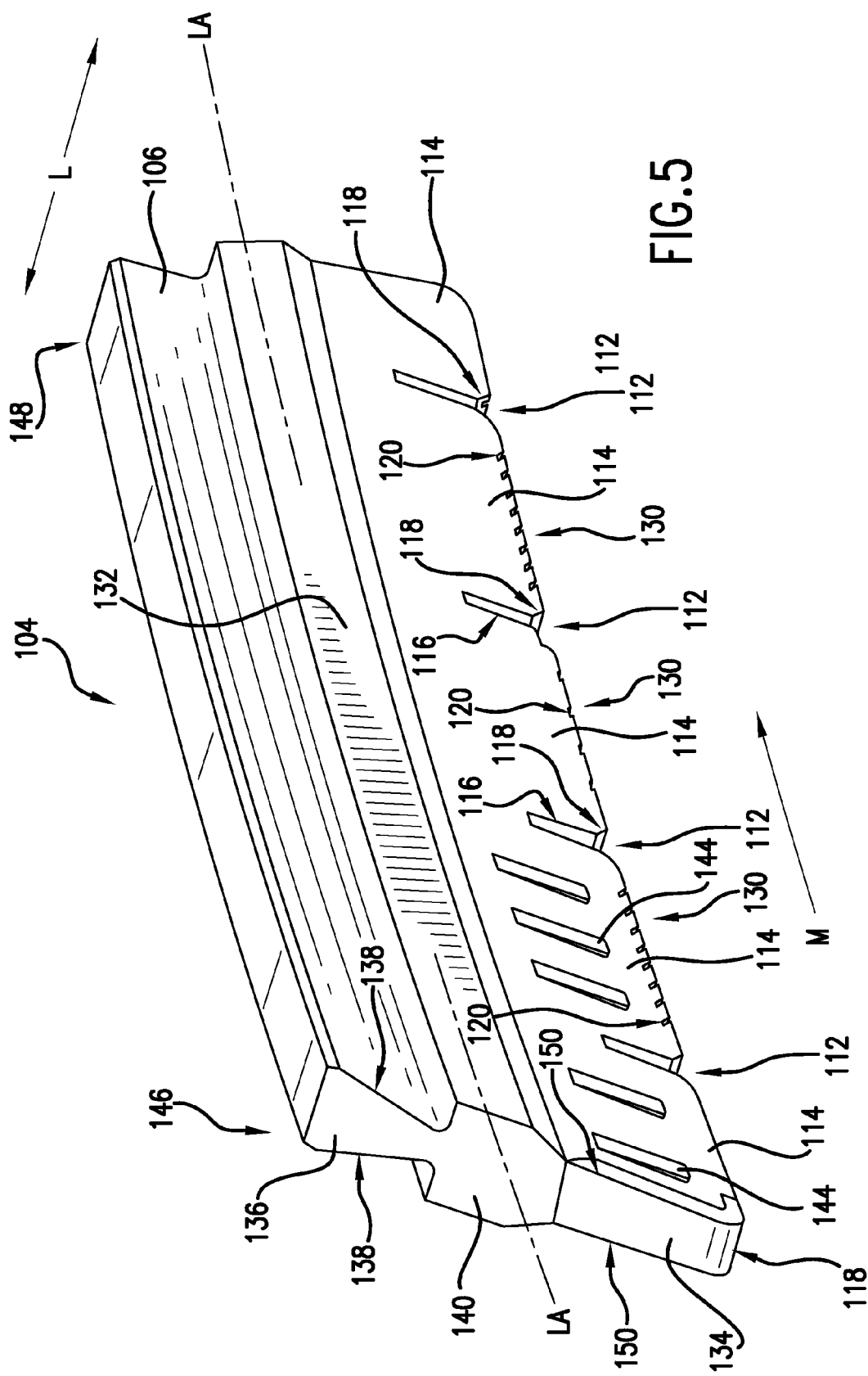
FIG. 5 is a perspective view of the top side of an exemplary cleaning element of the present invention.

Referring to FIGS. 3 and 5, each cleaning element 104 can be equipped with features to help secure its position in channels 110. For this exemplary embodiment, cleaning elements 104 each have a base 136 and an adjacent rib 140 (FIG. 5). Base 136 is provided with non-parallel opposing side walls 138 that are received in a complementary manner into channels 110. Rib 140 has a lateral width greater than the lateral width of channels 110 at the inside surface of wheel spat 102. Such cross-sectional shape helps secure cleaning elements 104 into channels 110 so that elements 104 can remain in place during contact with obstructions in longitudinal grooves 92. The particular cross-sectional shape for channels 110 and cleaning elements 104 shown in FIGS. 3 and 5 is provided by way of example only—other shapes and configurations may be used as well.

Figure 6:
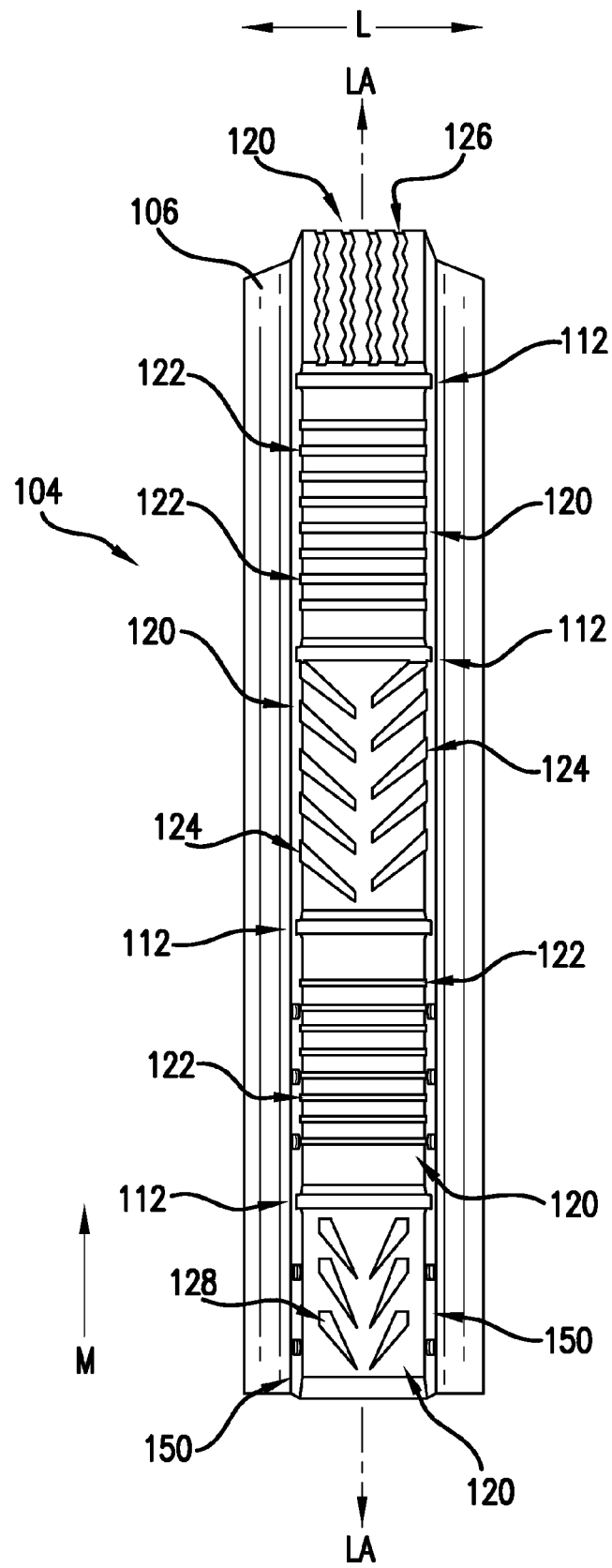
FIG. 6 provides a bottom view of the exemplary cleaning element of FIG. 5.
Figure 7:
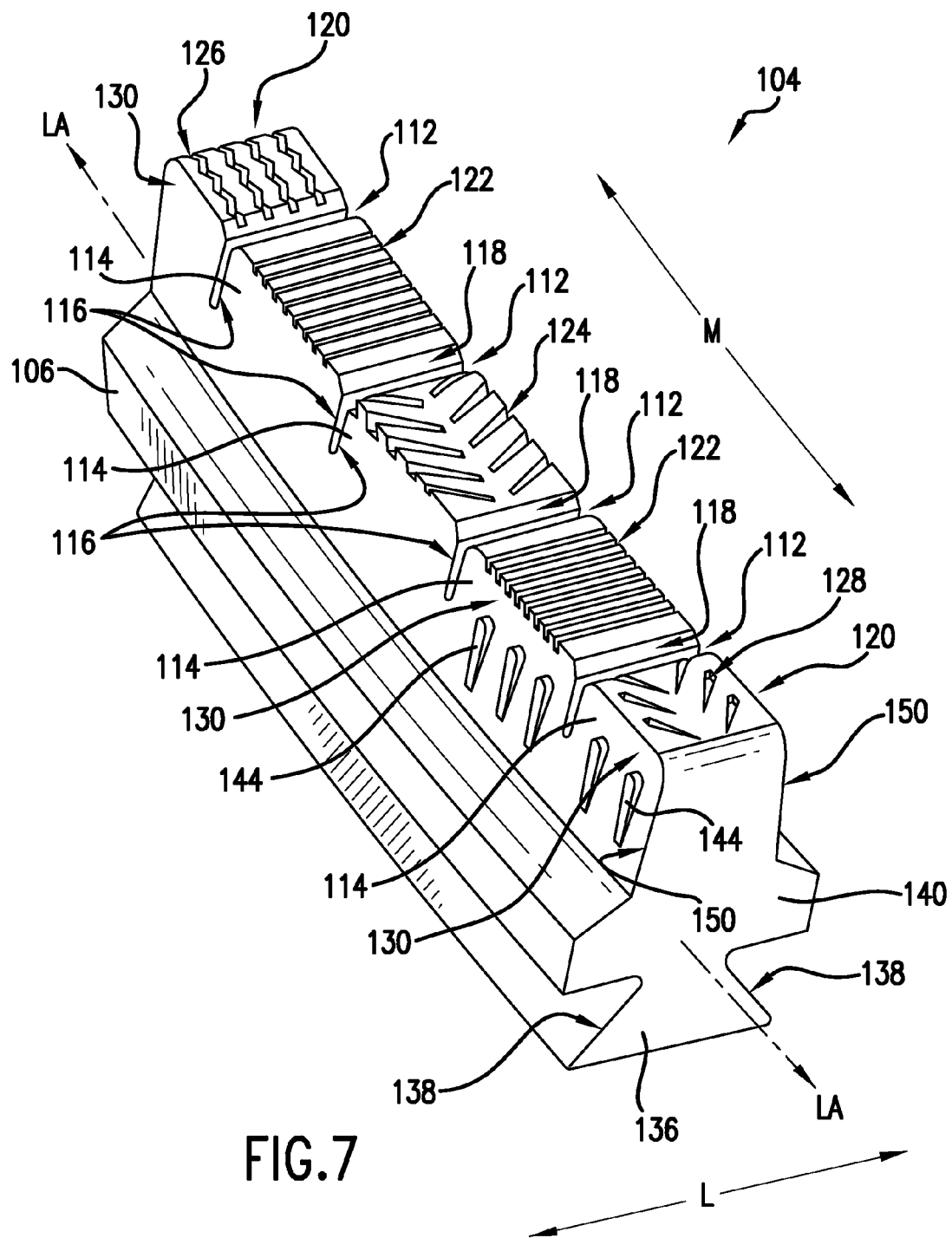
FIG. 7 is a perspective view of the bottom side of the exemplary cleaning element of FIG. 5.

Referring now to FIGS. 5, 6, and 7, cleaning element 104 is constructed as an elongated strip 106 having a longitudinal axis LA with a curvature that tracks or follows the curvature of tire 98 and, particularly, longitudinal groove 92 along circumferential direction C. It should be understood that the curvature of longitudinal axis LA and the curvature RC of longitudinal groove 92 need not be matched precisely or be perfectly parallel. However, close tracking between these two features to prevent contact between tire 98 and cleaning element 104 while maintaining device 100 in groove 92 can improve effectiveness and useful life of cleaning element 104. As will now be further described, cleaning element 104 can be provided with one or more features that can increase its effectiveness and robustness during use.

While a variety of materials may be used either singly or in combination, a resilient material such as rubber can improve the useful life of cleaning element 104. In one exemplary embodiment, a body portion 132 (FIG. 5) of cleaning element 104 is constructed from a resilient material while a hardened material is place along a leading edge 134. As used herein, "leading edge" refers to an edge that faces into the direction of rotation M of tire 98 during use. It should be understood that cleaning element 104 can be constructed to operate when vehicle 86 is moving in either a forward direction F or reverse direction RV (FIG. 1). As such, either or both of the opposing ends 146 and 148, for example, of cleaning element 104 can be constructed with hardened materials as a leading edge.

Continuing with FIGS. 5, 6, and 7, in this exemplary embodiment, cleaning element 104 is provided with a plurality of laterally extending grooves 112 that are spaced apart from each other along longitudinal axis LA. Grooves 112 are positioned along elongated strip 106 to provide cleaning element 104 with a plurality of fingers 114 that are separated by laterally extending grooves 112. During use and particularly impact with obstructions in longitudinal groove 92, laterally extending grooves 112 allows a certain amount of deflection of fingers 114 to improve durability.

Each finger 114 has a pair of opposing lateral sides 116 (FIG. 5). At least one of the lateral sides 116 defines a chamfered leading edge 118. The chamfer on leading edge 118 can help increase rigidity and durability of finger 114 while also helping to minimize buckling of finger 114 during use.

Cleaning element 104 (as well as each finger 114) has opposing longitudinal sides 150. One of more of the longitudinal sides 150 is equipped with protrusions or projections 144 that extend outwardly along lateral direction L from cleaning element 104. For this exemplary embodiment, projections 144 are shown as parallel to radial direction R. However, other shapes and orientations may be used for projections 144 as well. Projections 144 can assist in breaking up debris and prevent clogging between longitudinal side 150 and longitudinal grove 92.

Cleaning element 104 also includes a distal tip 130 that is positioned directly over groove bottom 94. Distal tip 130 is equipped with a plurality of micro-grooves 120 that are configured to assist in removing obstructions from longitudinal groove 92. By way of example, one finger 114 is provided with lateral extending micro-grooves 122. Another finger 114 includes partially extending micro-grooves 124 that are angled relative to lateral direction L. Wavy longitudinally extending micro-grooves 126 and scallops 128 are provided on other fingers 114. These features are provided by way of example. Other shapes and orientations may also be used differing from what is shown in the figures.

Figure 8:
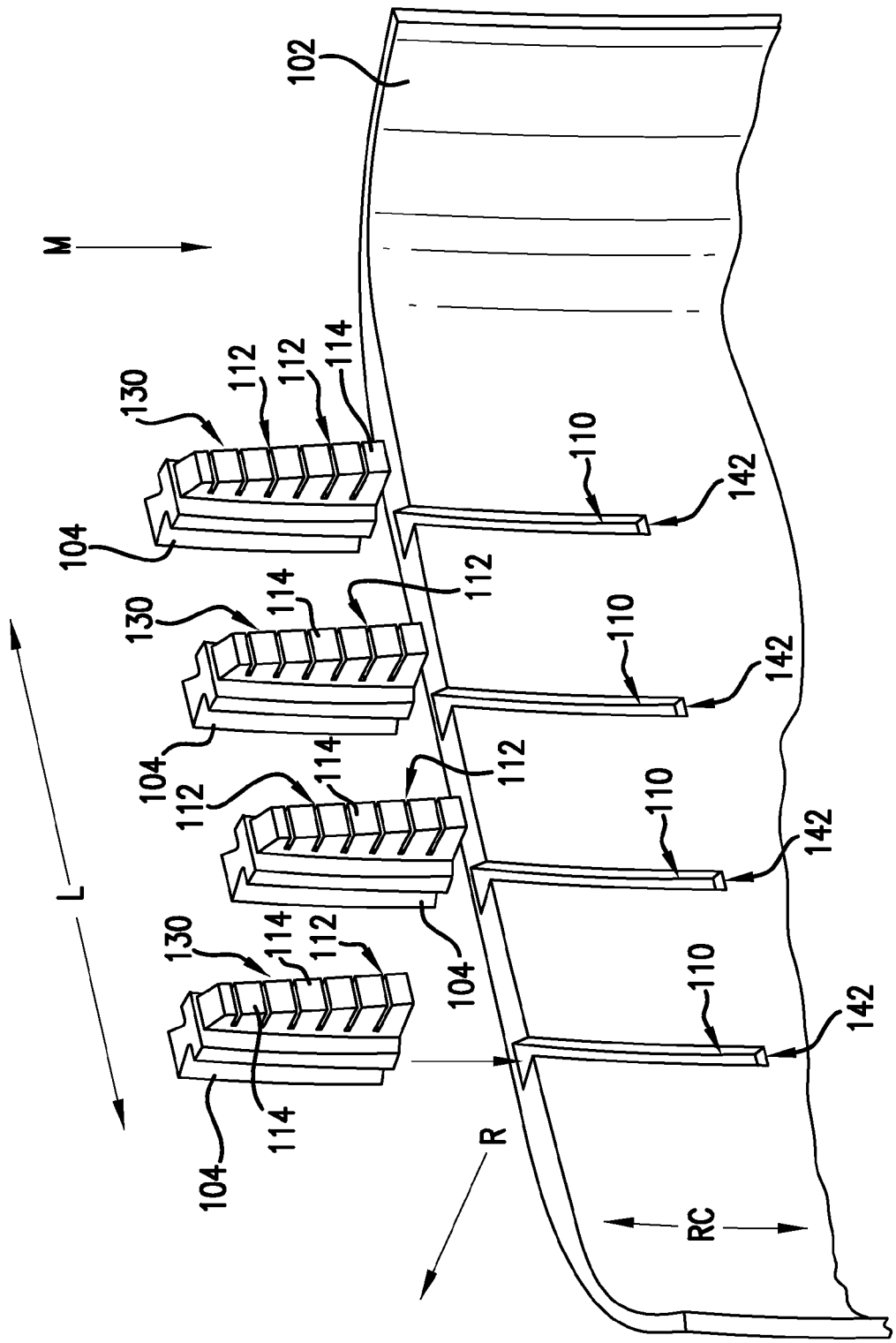
FIG. 8 is a perspective view of the underside of another exemplary wheel spat of the present invention showing insertion of another exemplary embodiment of cleaning elements.

Another exemplary embodiment of a cleaning element 104 and wheel spat 102 is shown in FIG. 8. As with previous embodiments, cleaning elements 104 are removably received into channels formed in wheel spat 102. Unlike previous embodiments, the distal tip 130 of each cleaning element 104 is sloped along longitudinal axis LA for this exemplary embodiment. More particularly, the length of each finger 114 along radial direction R increases from between end 146 and end 148. This slope can improve the ability of cleaning element 104 to eject obstructions from longitudinal groove 92 as tire 96 rotates in the direction of arrow M relative to wheel spat 102.

The above exemplary embodiments of the present invention have been described using wheel spat 102 for carrying one or more cleaning elements. As will be understood by one of skill in the art using the teachings disclosed herein, other constructions that do not utilize a wheel spat may also be employed for suspending one or move cleaning elements within the longitudinal grooves of a tire. For example, cleaning elements 104 could also be carried directly or indirectly by the vehicle from the suspension 154 (FIG. 1) without the use of wheel spat 102. Other constructions may also be employed.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A device for cleaning a tire of a vehicle, the tire having at least one longitudinal groove, the longitudinal groove having a curvature along a circumferential direction of the tire, the device comprising:
   a cleaning element carried by the vehicle and positioned within the groove of the tire, the groove having a groove bottom, the cleaning element suspended over the groove bottom so as to create a gap between the cleaning element and the groove bottom, the cleaning element having a longitudinal axis that tracks the curvature of the groove along the circumferential direction.

2. A device for cleaning a tire having a longitudinal groove as in claim 1, wherein the cleaning element comprises an elongated strip.

3. A device for cleaning a tire having a longitudinal groove as in claim 1, further comprising a groove extending along a wheel spat and adjacent to the tire, wherein the cleaning element is removably received in the groove of the wheel spat.

4. A device for cleaning a tire having a longitudinal groove as in claim 1, wherein the cleaning element further comprises a plurality of laterally extending grooves spaced apart from each other along the longitudinal axis.

5. A device for cleaning a tire having a longitudinal groove as in claim 1, wherein the cleaning element further comprises a plurality of fingers separated from each other along the longitudinal axis by laterally extending grooves.

6. A device for cleaning a tire having a longitudinal groove as in claim 5, wherein each finger has a pair of opposing lateral sides, and wherein each finger defines a chamfered leading edge along at least one of the opposing lateral sides.

7. A device for cleaning a tire having a longitudinal groove as in claim 1, wherein the cleaning element defines a distal tip positioned directly over the groove bottom and having a plurality of micro-grooves configured to assist in removing obstructions from the longitudinal groove of the tire.

8. A device for cleaning a tire having a longitudinal groove as in claim 1, wherein the cleaning element defines a pair of opposing longitudinal sides, at least one longitudinal side having a projection that extends along a lateral direction from the cleaning element and is configured to assist in removing obstructions from the longitudinal groove of the tire.

9. A device for cleaning a tire having a longitudinal groove as in claim 1, wherein the cleaning element further comprises a plurality of fingers separated from each other along the longitudinal axis by laterally extending grooves, each finger defining a distal tip having a plurality of features positioned on the distal tip and that are configured to remove obstructions from the longitudinal groove of the tire.

10. A device for cleaning a tire having a longitudinal groove as in claim 1, wherein the cleaning element comprises
a resilient material forming a body portion of the cleaning element; and,
a hardened material forming at least one leading edge of the cleaning element.

11. A device for cleaning a tire having a longitudinal groove as in claim 1, further comprising a wheel spat positioned proximate to the tire and carried by the vehicle, wherein the cleaning element is removably positioned on the wheel spat.

12. A tire cleaning device, comprising:
a wheel spat carried upon a non-sprung portion of a vehicle and positioned adjacent to a tire of the vehicle, the tire having at least one longitudinal groove with a groove bottom, the wheel spat providing a channel; and
a cleaning element removably received into the channel of the wheel spat, the cleaning element configured as an elongated strip positioned in the longitudinal groove of the tire and suspended above the groove bottom over a portion of the longitudinal groove.

13. A tire cleaning device as in claim 12, wherein the wheel spat defines a plurality of channels, and further comprising a plurality of cleaning elements received into the plurality of channels.

14. A tire cleaning device as in claim 12, further comprising a gap defined between the cleaning element and the groove bottom, and wherein the cleaning element has a longitudinal axis that follows the curvature of the tire.

15. A tire cleaning device as in claim 12, wherein the cleaning element further comprises a plurality of laterally extending grooves spaced apart from each other along a longitudinal axis of the cleaning element.

16. A tire cleaning device as in claim 12, wherein the cleaning element further comprises a plurality of fingers separated from each other along a longitudinal axis of the cleaning element by laterally extending grooves.

17. A tire cleaning device as in claim 16, wherein each finger has a pair of opposing lateral sides, and wherein each finger defines a chamfered leading edge along at least one of the opposing lateral sides.

18. A tire cleaning device as in claim 12, wherein the cleaning element defines a distal tip positioned directly over the groove bottom, the distal tip having a plurality of micro-grooves configured to assist in removing obstructions from the longitudinal groove of the tire.

19. A cleaning element for a tire having at least one longitudinal groove, the longitudinal groove having a curvature along a circumferential direction of the tire, the cleaning element comprising:
an elongated strip having a body portion comprising a resilient material, the elongated strip having a longitudinal axis that tracks the curvature of the longitudinal groove along the circumferential direction of the tire, the elongated strip configured to be suspended within the longitudinal groove of the tire so as to create a gap between the elongated strip and the groove.

20. A cleaning element for a tire as in claim 19, wherein the cleaning element further comprises a plurality of fingers separated from each other along the longitudinal axis of the elongated strip and by one or more laterally extending grooves.

* * * * *